3,055,911
SUBSTITUTED TETRAZOLES

William G. Finnegan and Ronald A. Henry, China Lake, Calif., and Sol Skolnik, Indian Head, Md., assignors to the United States of America as represented by the Secretary of the Navy
No Drawing. Filed Apr. 29, 1958, Ser. No. 732,780
9 Claims. (Cl. 260—308)
(Granted under Title 35, U.S. Code (1952), sec. 266)

The invention described herein may be manufactured and used by or for the Government of the United States of America for governmental purposes without payment of any royalties thereon or therefor.

This invention relates to vinyltetrazoles, polyvinyl tetrazoles, and the method for preparing them.

The object of this invention is the preparation and polymerization of vinyl-substituted compounds containing a large percentage of nitrogen, that is, vinyltetrazoles and their substitution products. The ultimate objective is to provide polymers containing large percentages of nitrogen, which are soluble in a variety of solvents, compatible with single and double-base propellent formulations and which are useful as polymeric fuel matrices, and binders for composite propellants and explosives of various types. Illustrative compounds of this invention are 1- and 2-methyl-5-vinyltetrazoles, 1- and 2-vinyltetrazoles, 1- and 2-vinyl-5-aminotetrazoles, and polymers of these compounds.

The new compounds are prepared in accordance with the following examples:

1- AND 2-VINYLTETRAZOLES 1- and 2-vinyltetrazoles, and 1- and 2-vinyl-5-aminotetrazoles are readily synthesized starting with tetrazole and 5-aminotetrazole as follows: Sodium tetrazole is alkylated with 2-chloroethanol to form a mixture of 1- and 2-(2-hydroxyethyl)tetrazoles which are in turn chlorinated with thionyl chloride. The chloro derivatives are converted to the vinyl compounds by dehydrohalogenation. The 1- and 2-vinyltetrazoles are isolated by distillation at reduced pressure. 1- and 2-vinyl-5-aminotetrazoles can be synthesized by the same procedure, starting with sodium 5-aminotetrazole. The following equations illustrate the above preparation:

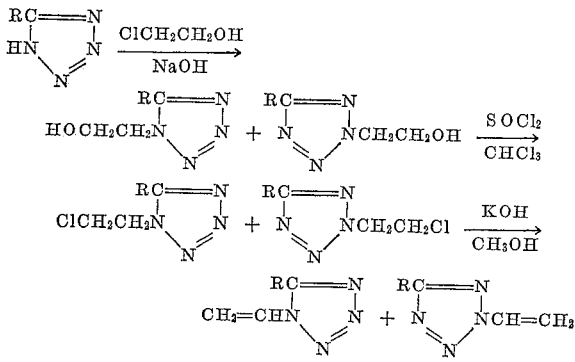

where R is H or amino.

1- and 2-(2-Hydroxyethyl)Tetrazoles

A suspension of 140 g. (2.0 moles) of tetrazole in 300 ml. of distilled water, contained in a 2-liter, 2-necked round bottomed flask with a reflux condenser, was neutralized to a phenolphthalein endpoint with a solution of 82.5 g. (2.0 moles) of 97 percent sodium hydroxide in 300 ml. of water. The solution of sodium tetrazole was heated to reflux and 201 g. (2.5 moles) of 2-chloroethanol was added from an addition funnel over a 15 minute period. The resulting solution was refluxed for 18 hours and then concentrated in vacuo on a steam bath to a syrupy mixture of products and sodium chloride.

The hydroxyethylated products were extracted from the sodium chloride with one 300 ml. and three 100 ml. portions of boiling acetone. Concentration of the acetone extracts in vacuo on a steam bath yielded 236 g. (theory 288 g.) of a mixture of 1- and 2-(2-hydroxyethyl)tetrazoles and other alkylated products. The two products can be separated by acetylation of the mixture with acetic anhydride and distillation of the acetates at reduced pressure.

1- and 2-(2-Chloroethyl)Tetrazoles

The mixture of 2-hydroxyethyltetrazoles (236 g.) from the preceding section was slurried with 250 ml. of chloroform in a 2-liter, 3-necked flask equipped with a reflux condenser, "true-bore" stirrer and an addition funnel. Thionyl chloride (300 g., 2.5 moles) was added dropwise with stirring while the temperature of the reaction mixture was maintained below 20° C. by immersing the flask in an ice bath. The cooling bath was then removed and the mixture was allowed to stir at room temperature for 24 hours. The reaction mixture became homogeneous during this time. The mixture was refluxed for two hours to drive off hydrogen chloride and sulfur dioxide and then concentrated to a syrup at reduced pressure on a steam bath. After cooling to 5° C., the syrup was treated with 100 g. of crushed ice, with stirring, to decompose any thionyl chloride complexed with the tetrazoles. After the initial reaction was over the excess ice was melted by warming the mixture on a steam bath and the chloroethyltetrazoles were extracted with three 100 ml. portions of chloroform. Evaporation of the chloroform solution left 265 g. of 1- and 2-(2-chloroethyl)tetrazoles as a yellow viscous oil. Separations of the isomers was possible at this point by distillation. Distillation of the chloroethyltetrazoles from 3.8 moles of tetrazole yielded 154.3 g. (30.7%) of 2-(2-chloroethyl) tetrazole, B.P. 76° C. at 1 mm. The 1-(2-chloroethyl)tetrazole was not distilled, but could be, using molecular distillation techniques.

1- and 2-Vinyltetrazole

The 265 g. (ca. 2.0 moles) of chloroethyltetrazoles from the preceding chlorination and 1 g. of hydroquinone were dissolved in 200 ml. of methanol in a 2-liter, 3-necked flask equipped with a reflux condenser, "True Bore" stirrer and addition funnel and the solution was heated to reflux.

A solution of 132 g. (2.0 moles) of 85 percent potassium hydroxide in 400 ml. of methanol was added dropwise with stirring over a one hour period. Precipitation of potassium chloride began immediately. Reflux was continued for 30 minutes after the addition was complete. The methanol was then distilled at atmospheric pressure; stirring was continued to prevent bumping. After cooling the residue of vinyl tetrazoles, water, and potassium chloride to room temperature, the vinyltetrazoles were extracted with three 100 ml. portions of methylene chloride. The methylene chloride solution was dried with anhydrous magnesium sulfate and an additional gram of hydroquinone was added to prevent polymerization. Distillation of the methylene chloride at atmospheric pressure left a residue of 1- and 2-vinyltetrazoles which was distilled at reduced pressure to yield: 38.6 g. (20.1% yield based on tetrazole) of 2-vinyltetrazole, B.P. 66°—68° C. at 60 mm., $N_D^{20}$ 1.4850, $D_4^{20}$ 1.131,

*Analysis.*—Calcd. for $C_3H_4N_4$: C, 37.49; H, 4.19; N, 58.31. Found: C, 37.62; H, 4.60; N, 57.82.

and 70.6 g. (36.8% yield based on tetrazole) of 1-vinyltetrazole, B.P. 94° C. at 1 mm., $N_D^{20}$ 1.500, $D_4^{20}$ 1.179.

*Analysis.*—Calcd. for $C_3H_4N_4$: C, 37.49; H, 4.19. Found: C, 37.73; H, 4.54.

Dehydrohalogenation of 154.3 g. (1.17 moles) of distilled 2-chloroethyltetrazole by the same procedure yielded 78.0 g. (70%) of 2-vinyltetrazole.

1- AND 2-VINYL-5-AMINOTETRAZOLES

1- and 2-Hydroxyethyl-5-Aminotetrazole

A solution of 2 moles of the sodium salt of 5-aminotetrazole was made in a 2-liter, 2-necked flask by neutralizing a suspension of 206 g. (2.0 moles) of 5-aminotetrazole monohydrate in 200 ml. of water to a phenolphthalein endpoint with a solution of 82.5 g. (2.0 moles) of 97 percent sodium hydroxide in 200 ml. of water. The solution was heated to reflux and 180 g. (2.2 moles) of 2-chloroethanol was added over a 15 minute period. The resulting solution was refluxed over night and then stripped to dryness in vacuo on a steam bath. The syrupy residue of products and sodium chloride was extracted with two 200 ml. portions of boiling acetone. The combined acetone extracts were cooled to 5° C. and 61.2 g. (23.7%) of 1-(2-hydroxyethyl)-5-aminotetrazole were removed by filtration. An additional 12.6 g. of product were obtained by evaporation of the acetone filtrate to dryness, redissolving the residue in 400 ml. of boiling absolute ethanol and chilling the ethanol solution for 48 hours at 5° C. The total of 73.8 g. represents a 28.58% yield of 1-(2-hydroxyethyl)-5-aminotetrazole. Recrystallization from 600 ml. of boiling ethanol gave 61.2 g. (23.7%) of pure product M.P. 159°–161° C.

*Analysis.*—Calcd. for $C_3H_7ON_5$: C, 27.90; H, 5.47; N, 54.24. Found: C, 27.97, 28.21; H, 5.14, 5.30; N, 53.87, 54.09.

Evaporation of the ethanol filtrates (including the recrystallization mother liquors or 1-isomer) in vacuo on a steam bath left 191 g. of oily residue which on standing, partially solidified. This residue was slurried with ice cold absolute ethanol and filtered, yielding 96.8 g. (37.4%) of 2-(2-hydroxyethyl)-5-aminotetrazole. Recrystallization from ethyl acetate yielded 60.0 g. (23.2%) of pure product, M.P. 86.5°–88.5° C.

*Analysis.*—Calcd. for $C_3H_7ON_5$: C, 27.90; H, 5.47; N, 54.24. Found: C, 28.24; H, 5.41; N, 53.65.

1-(2-Chloroethyl)-5-Aminotetrazole

Thionyl chloride (150 ml.) was placed in a 500 ml. flask and cooled to 5° C. in an ice bath. 1-(2-hydroxyethyl)-5-aminotetrazole (45.4 g., 0.352 mole) was added portionwise with shaking and cooling to maintain the temperature bbelow 20° C. The mixture was then heated to reflux for four hours. Hydrogen chloride and sulfur dioxide were evolved and the mixture became homogeneous. The excess thionyl chloride was then removed in vacuo on a steam bath and the residue was treated (after cooling to room temperature) with 50 ml. of 95 percent ethanol to decompose any complexed thionyl chloride. When the exothermic reaction had subsided, 50 ml. of water was added and the mixture was stripped to dryness at reduced pressure on a steam bath. The solid residue was dissolved in 250 ml. of boiling water, decolorized with charcoal and the solution was cooled to 5° C. overnight. The yietld of 1-(2-chloroethyl)-5-aminotetrazole amounted to 39.24 g. (75.7% yield based on 1-(2-hydroxyethyl)-5-aminotetrazole), M.P. 150°–151.5° C.

*Analysis.*—Calcd. for $C_3H_6N_5Cl$: N, 47.46; Cl, 24.03. Found: N, 48.4; Cl, 24.40.

2-(2-Chloroethyl)-5-Aminotetrazole

The chlorination of 78.5 g. (0.609 mole) of 2-(2-hydroxyethyl)-5-aminotetrazole was accomplished in the same manner as that described for the 1-isomer. Recrystallization of the crude product from benzene yielded 55.4 g. (61.8% yield) of pure 2-(2-chloroethyl)-5-aminotetrazole, M.P. 51–52.5° C.

*Anaylsis.*—Calcd. for $C_3H_6N_5Cl$: N, 47.46; Cl, 24.03. Found: N, 48.6; Cl, 24.0.

1-Vinyl-5-Aminotetrazole

A solution of 39.79 g. (0.27 mole) of 1-(2-chloroethyl)-5-aminotetrazole and 0.1 g. of hydroquinone in 150 ml. of methanol, contained in a 1-liter flask equipped with a reflux condenser, "True-Bore" stirrer and an addition funnel, was heated to reflux. A solution of 18 g. (0.27 mole) of 85 percent potassium hydroxide in 100 ml. of methanol was then added dropwise with stirring over a period of 30 minutes. The reaction was refluxed for one hour after the addition was complete and then cooled to 20° C. After the precipitated potassium chloride was removed by filtration the solution was concentrated to dryness at reduced pressure on a steam bath. The residue of impure 1-vinyl-5-aminotetrazole was dissolved in a minimum of hot water and cooled, yielding 22.75 g. (0.247 mole) of 1-vinyl-5-aminotetrazole, M.P. 157°–158° C. An additional 2.30 g. was recovered by concentrating and cooling the mother liquors. The total of 26.05 g. represents an 86.8 percent yield based on 1-(2-chloroethyl)-5-aminotetrazole.

*Analysis.*—Calcd. for $C_3H_5N_5$: C, 32.42; H, 4.54; N, 63.04. Found: C, 32.5; H, 4.72; N, 64.0.

2-Vinyl-5-Aminotetrazole

The dehydrohalogenation of 40.47 g. (0.274 mole) of 2-(2-chloroethyl)-5-aminotetrazole with potassium hydroxide in methanol was accomplished in the same manner as for the 1-isomer. The crude product was obtained as an oil (30 g.) which was distilled at reduced pressure to yield 23.39 g. (77.7% yield based on the starting chloro compound), B.P. 75–77° C. at 0.8 mm., MP. 47.49° C. after recrystallization from carbon tetrachloride The melting point of a sample, purified for analysis by sublimation at reduced pressure, was unchanged

*Analysis.*—Calcd. for $C_3H_5N_5$: C, 32.42; H, 4.54; N, 63.04. Found: C, 33.00; H, 4.44; N, 61.50.

1- AND 2-ALLYLTETRAZOLES

A suspension of 70 g. (1.0 mole) of tetrazole in 400 ml. of 95 percent ethanol contained in a 2-liter, 3-necked flask equipped with a reflux condenser, "True-Bore" stirrer and an addition funnel, was neutralized to a phenolphthalein endpoint with a 50 percent aqueous solution of 41.2 g. (1.0 mole) of 97 percent sodium hydroxide. The suspension was heated to boiling and 121 g. (1.1 moles) allyl bromide was added dropwise with stirring over a 10 minute period and the solution was heated overnight. The ethanol was then removed by distillation at atmospheric pressure and the residue was extracted with three 100 ml. portions of cold benzene. After drying the solution with anhydrous magnesium sulfate, the benzene was distilled at atmospheric pressure. The residue of 101 g. (88.9%) of mixed 1- and 2-allyltetrazoles was distilled at reduced pressures, yielding 36.3 g. (28.96%) of 2-allyltetrazole. B.P. 80–81° C. at 20 mm., $N_D^{20}$ 1.4670, $D_4^{20}$ 1.084.

*Analysis.*—Calcd. for $C_4H_6N_4$: C, 43.62; H, 5.49; N, 50.89. Found: C, 43.51; H, 5.63; N, 51.22.

and 41.52 g. (37.36%) of 1-allyltetrazole, B.P. 101° at 1 mm., $N_D^{20}$ 1.4854, $D_4^{20}$ 1.121.

*Analysis.*—Calcd. for $C_4H_6N_4$: C, 43.62; H, 5.49; N, 50.89. Found: C, 44.23; H, 5.45; N, 50.71.

1- and 2-methyl-5-vinyltetrazoles are synthesized by a four-step synthesis starting with hydracrylonitrile as follows: 5-(2-hydroxyethyl)tetrazole is synthesized by the reaction of hydracrylonitrile with ammonium azide in dimethylformamide solution. Methylation of its sodium salt with dimethylsulfate yields a mixture of 1- and 2-methyl-5-(2-hydroxyethyl)tetrazoles, which are chlorinated with thionyl chloride. The chloride derivatives are converted to the vinyl compounds by separate dehydrohalogenation techniques, after they are separated by vacuum distillation. The following equations illustrate the above preparation:

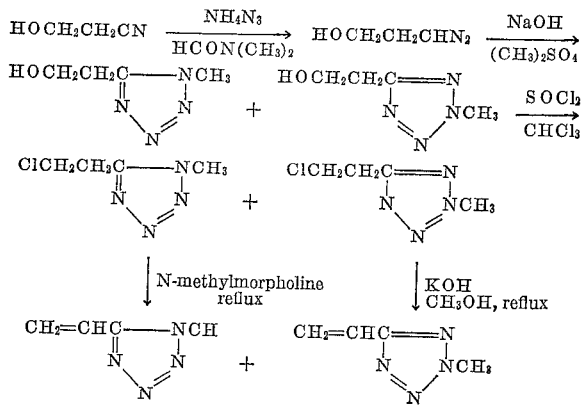

1- AND 2-METHYL-5-VINYLTETRAZOLES

5-Hydroxyethyltetrazole

A mixture of 213 g. (3.0 moles) of hydracrylonitrile, 214.8 g. (3.3 moles) of sodium azide, 176.7 g. (3.3 moles) of ammonium chloride and 1500 ml. of dimethylformamide, recovered from a previous synthesis, is heated at 123°–127° C. with stirring for 24 hours. The dimethylformamide is then removed at 100° C. under reduced pressure (ca. 20 mm.). Care should be taken to remove the dimethylformamide in this operation as completely as possible. The residue of sodium chloride and 5-hydroxyethyltetrazole is then dissolved in 250 ml. of water and made basic with a solution of 140 g. (3.5 moles) of sodium hydroxide in 250 ml. of water. The temperature should be maintained at ca. 25° C. during this step to prevent excessive foaming. The solution is then stripped to about half volume at reduced pressure on a steam bath. The pH of the solution at this time should be nine or higher. If the pH is lower than nine, additional base should be added and the evaporation continued until the pH remains at nine or higher. The solution is then cooled to room temperature and acidified to about pH 2 with 300 ml. of concentrated hydrochloric acid (or more if additional base had been used). It is advantageous at this point to cool the solution to 5° C. and remove the precipitated sodium chloride by filtration. The filter cake is washed with 95 percent ethanol and the filtrate combined with the product solution. The acidified product solution and alcohol washings are then stripped of solvents at 100° C. under reduced pressure. The 5-hydroxyethyltetrazole is then extracted from the residue with one 500 ml., one 250 ml. and one 125 ml. portions of cold 94 percent ethanol and neutralized to a phenolphthalein endpoint by the addition of a solution of 197.4 g. (3.0 moles) of 85 percent potassium hydroxide in 625 ml. of 95 percent ethanol with stirring and cooling.

1- and 2-Methyl-5-(2-Hydroxyethyl)Tetrazoles

The 3.0 moles of potassium 5-hydroxyethyltetrazole in 1500 ml. of 95 percent ethanol from the previous reaction is placed in a 3 liter, 3 necked flask.

Potassium bicarbonate (30 g., 0.3 mole) is added and 417 g. (3.3 mole) of dimethyl sulfate is added dropwise with stirring over a 30 minute period. The temperature of the solution is maintained at 28–33° C. during the addition and for an additional 30 minutes and then raised to 40°–45° C. for 30 minutes. The solution is then cooled to 5° C. The precipitate of potassium methylsulfate is removed by filtration and the filter cake is washed with several portions of 95 percent ethanol. The combined ethanol filtrates are evaporated to dryness at reduced pressure on a steam bath.

The 1- and 2-methyl-5-(2-hydroxyethyl)tetrazoles are extracted from the residue with a total of 350 ml. of chloroform and the chloroform solution is dried for one hour with magnesium sulfate, or alternatively by azeotropic distillation of part of the chloroform. (If the vacuum stripping of the ethanol and water in the previous step is thorough, the chloroform solution should be essentially dry. Care should be taken that the chloroform solution is dry before the chlorination reaction.)

1- and 2-Methyl-5-(2-Chloroethyl)Tetrazoles

The solution of 1- and 2-methyl-5-(2-hydroxyethyl)tetrazoles in 350 ml. of chloroform from the preceding methylation reaction is cooled to 5° C. and 330 ml., 537 g. (4.5 moles) of thionyl chloride is added with stirring at a rate such that the reaction temperature does not rise about 25° C. The solution is then heated to reflux for four hours, or longer if necessary, to complete the evolution of hydrochloric acid and sulfur dioxide. The chloroform and excess thionyl chloride are then removed at reduced pressure on a steam bath. The heating at reduced pressure should be thorough to ensure complete removal of any thionyl chloride, but it is also essential that there be excess thionyl chloride at the end of the reflux period. The residue of products is then cooled to room temperature and dissolved in 300 ml. of chloroform. Water (200 ml.) is added and the mixture is stirred and cooled to 5° C. Solid sodium bicarbonate is then added, with stirring and cooling in sufficient quantity (0.2–0.3 mole/mole) to bring the pH of the mixture to 6–7. The chloroform layer is then separated and the water layer is extracted with an additional 100 ml. portion of chloroform. The combined chloroform solutions are dried with magnesium sulfate and stripped to dryness at reduced pressure on a steam bath. The residue of mixed 1- and 2-methyl-5-(2-chloroethyl)tetrazoles is then heated to 100° C. at 10–20 mm. pressure and stripped of the low boiling impurities present. 2-methyl-5-(2-chloroethyl)tetrazole is then removed from the mixture of chloro compounds by high vacuum distillation.

2-Methyl-5-Vinyltetrazole

The 2-methyl-5-(2-chloroethyl)tetrazole from the preceding reaction is dissolved in 250 ml. of methanol and the solution is heated to reflux. A solution of approximately 98.5 g. (1.5 moles) of 85 percent potassium hydroxide in 500 ml. of methanol is then added dropwise with stirring over a period of one hour and the reaction is stirred and refluxed from an additional hour. The solution is then cooled to room temperature, neutralized to pH 6–7 with concentrated hydrochloric acid and one gram of hydroquinone is added. The methanol is removed by distillation at atmospheric pressure on a steam bath. The residue of salts and products is cooled to room temperature and the products are extracted with one 150 ml. and two 50 ml. portions of methylene chloride. The methylene chloride solution is dried with magnesium sulfate and the solvent is removed by distillation at atmospheric pressure on a steam bath. The 2-methyl-5-vinyl tetrazole is removed from the mixture of crude products by distillation at 20 mm. pressure; B.P. ca. 80° C., $N_D^{25}$ ~1.4800.

1-Methyl-5-Vinyltetrazole 1-methyl-5-(2-chloroethyl)tetrazole separated from the residue of mixed 1- and 2-methyl-5-(2-chloroethyl)tetrazoles as outlined above was used in this example. A solution of 229 g. of undistilled but partially purified 1-methyl-5-(2-chloroethyl)tetrazole in 275 ml. of dried, distilled N-methylmorpholine was heated under reflux on the steam bath for eight hours.

(The crude 1-methyl-5-(2-chloroethyl)tetrazole remaining after the 2-isomer has been removed by distillation is a dark brown, murky oil. Its appearance can be greatly improved by dissolving it in toluene (4.5 ml. per gram) at room temperature, stirring with decoloring charcoal, filtering and evaporating. The treatment with toluene precipitates much dark tar. The resulting chloro compound is clear and orange-yellow in color. The recovery from 260 g. of crude product was 229 g.

(N-methylmorpholine was chosen as the tertiary base for this dehydrohalogenation for several reasons: (1) The chloro compound is readily and completely miscible in this solvent. By way of contrast, the chloro compound is only poorly soluble in triethylamine. (2) The moderate boiling point of about 104° C. at 785 mm. permits easy removal of excess solvent from the monomer without overheating; furthermore, if the reaction becomes vigorous, the boiling of the excess amine will serve to moderate and maintain a reasonable temperature. (3) The hydrochloride separates from the reaction solution as coarse, easily filterable crystals with little or no tendency to gum.)

A very definite exothermic reaction was noted about one-half hour after heating commenced; the heating was discontinued for a few minutes until this vigorous reaction ceased. The solution was cooled to 5° C., diluted with 600 ml. of fresh diethyl ether, and recooled to 5° C. The precipitated N-methylmorpholine hydrochloride was removed by filtration and washed with two 100 ml. portions of diethyl ether. The combined extracts were evaporated under reduced pressure (15 mm.) and to a final pot temperature of 100° C. The yield was 156.6 g. An additional quantity of less pure material was obtained by extracting the cake of N-methylmorpholine hydrochloride with several portions of methylene chloride, and evaporating the methylene chloride.

(Although the pure 1-methyl-5-vinyltetrazole is only sparingly soluble in diethyl ether, this monomer is apparently reasonably soluble in the mixture of diethyl ether and unreacted N-methylmorpholine. The monomer is much more soluble in methylene chloride; however, this solvent is not recommended since it also extracts any polymer and tars which are formed during the dehydrohalogenation; the crude monomer so obtained is more difficult to handle in the molecular still.

(The weight of dried N-methylmorpholine hydrochloride remaining after the methylene chloride extraction was 191.8 g., or 89.3 percent theory.)

The crops of impure 1-methyl-5-vinyltetrazole were distilled separately in a falling-film, molecular-still at a pressure of about one micron and a jacket temperature of about 120° C. The total yield of canary yellow product was 151 g. (87.8%); $n_D^{25}=1.5046$. Two additional distillations in a molecular still gave an almost water-white monomer ($n_D^{25}=1.5044$) which crystallized between 15 and 20° C. when seeded.

Analytical data for 1- and 2-methyl-5-vinyltetrazoles, some of the intermediate compounds and one polymer, disclosed above, are set forth in the following table.

| Compound | Analysis | | | | | |
|---|---|---|---|---|---|---|
| | Carbon | | Hydrogen | | Nitrogen | |
| | Calcd. | Found | Calcd. | Found | Calcd. | Found |
| 5-(2-Hydroxyethyl) tetrazole | 31.57 | 31.59 | 5.30 | 5.23 | 49.10 | 49.17 |
| 2-methyl-5-(2-hydroxyethyl) tetrazole | 37.49 | 37.05 | 6.29 | 6.32 | 43.73 | 44.00 |
| 2-methyl-5-(2-chloroethyl) tetrazole | 32.77 | 32.72 | 4.82 | 4.73 | 38.23 | 38.50 |
| 1-methyl-5-vinyltetrazole | 43.62 | 43.81 | 5.49 | 5.70 | 50.89 | 51.34 |
| 2-methyl-5-vinyltetrazole | 43.62 | 43.63 | 5.49 | 5.66 | 50.89 | 50.60 |
| poly(2-methyl-5-vinyltetrazole) | 43.62 | 43.70 | 5.49 | 5.76 | 50.89 | 50.53 |

Another experiment on a smaller scale gave a yield of 86.7 percent.

The monomeric compounds prepared above may be polymerized by standard polymerization techniques, including bulk and emulsion polymerization techniques and others. The polymerization of the compounds is typified by the bulk and emulsion polymerization of 2-methyl-5-vinyltetrazole. Emulsion polymerization of this monomer was accomplished as follows: 11 g. (0.1 mole) of 2-methyl-5-vinyltetrazole was added with stirring to a solution of 15 drops of sorbitan trioleate in 80 ml. of distilled water. Nitrogen was bubbled through the water during the formation of the emulsion and the duration of the polymerization. The emulsion was cooled to 0–2° C. in an ice bath. One ml. of a solution of 0.03 g. of ferrous sulfate heptahydrate in 100 ml. of distilled water was added, followed by 0.025 g. of ammonium persulfate and 0.025 g. of sodium metabisulfite. The temperature was maintained at 1–2° C. After 24 hours, the conversion to polymer was estimated at 30–50 percent and after 46 hours the conversion appeared reasonably complete, although some odor of monomer was still present. The product was a solid rubbery mass at this point. The polymer was kneaded under distilled water until free of soap and inorganic salts, cut into small pieces and dried. The dried polymer was dissolved in 250 ml. of ethylene dichloride and precipitated into 500 ml. of cyclohexane. The polymer was removed by filtration and dried. Intrinsic viscosities in chloroform at 25° C. for polymers from various batches prepared as above varied from 3.910 to 4.232 depending upon the batch.

Bulk polymerization of 2-methyl-5-vinyltetrazole was effected by the use of benzoyl peroxide or azobisisobutyronitrile as the catalyst. Intrinsic viscosities in chloroform at 25° C. for the polymer prepared by this method varied from 1.055 (60° C., 1 mole percent azobisisobutyronitrile) to 3.812 (40° C., 0.1 mole percent azobisisobutyronitrile). One polymer, from a bulk polymerization run for 48 hours at 50° C. (0.1 mole percent azobisisobutyronitrile), had an intrinsic viscosity in chloroform at 25° C. of 5.606. Precipitated poly 2-methyl-5-vinyltetrazole (purified polymer from a bulk polymerization run for five days at 40° C., 0.1 mole percent azobisisobutyronitrile) was vacuum pressed into pellets at 110° C. and 3000 p.s.i. The pellets were well consolidated and semitranslucent. Molecular weights estimated from intrinsic viscosity data varied in a range from 500,000 to several million.

The utility of the vinyl-substituted tetrazoles and their polymers is illustrated by that for a typical polymer, poly 2-methyl-5-vinyltetrazole. This polymer is a soluble, high molecular-weight thermoplastic containing 50.8 percent nitrogen. It is an exceptionally versatile new ordnance material, having application as an ingredient in clean, slow burning gas generator compositions, new igniter compositions as substitutes for black powder, a new family of homogeneous high energy propellants, a new series of high energy plastic bonded explosives and strongly adherent match head compositions for squib bridge wires. The adaptation of the polymer for the above applications is based on its property of undergoing a sustained decomposition to its elements under pressure in the absence of oxidizers, its property of dissolving certain new high energy explosives, its property of desensitizing high explosives, high thermal and vacuum stability, chemical inertness and its good bonding characteristics with metals, glasses and organic and inorganic solids.

Poly 2-methyl-5-vinyltetrazole is soluble in chlorinated hydrocarbons, acetonitrile, nitromethane, methyl lactate and the usual powerful polymer solvents, such as, dimethylformamide and butyrolactone. Bulk polymerized material, containing a few percent of low molecular weight polymer and monomer, shows no brittle down to temperature as low as −50° C., and decomposes in 2–5 seconds to gaseous products and carbon at about 300° C. and atmospheric pressure. The density of the polymer is 1.28 g./cc.; the monomer has a density of 1.08 g./cc.

Vacuum stability measurements of carefully dried, emulsion polymerized 2-methyl-5-vinyltetrazole have been made. The evolution of gas at 145° C. was 1.3 ml./g. (STP) in 45.25 hr. and 4.6 ml./g. in 166.25 hr. A plot of gas produced vs. time is linear, indicating that the decomposition is not autocatalytic.

The heats of combustion and formation of poly 2-methyl-5-vinyltetrazole are −5753.51±7.26 cal./g. and 475.9 cal./g., respectively. The measured heat of explosion averages 410 cal./g.

The most strinking characteristic of the polyvinyltetrazoles is their ability to undergo a sustained exothermic decomposition in the absence of oxidizers, when ignited under an intert gas at pressures greater than about 100 p.s.i. This ready decomposition undoubtedly accounts for the general applicability of poly 2-methyl-5-vinyltetrazole as a fuel-binder in composite propellant, gas grain, pyrotechnic, ignitor and match head compositions. Its ability to form strong bonds with metals, glasses and organic and inorganic solids contributes to its success as a desensitizer for high explosives and as a binder for match head compositions. Composite formulations of polymer and oxidizers or high explosives, containing as little as 5 percent of polymer press readily at ambient temperature and 3,000 and 10,000 p.s.i. to coherent pellets, whose density approaches the theoretical for the mixture. Poly 2-methyl-5-vinyltetrazole is compatible with double-base propellent formulations and dissolves certain new high energy explosives, such as trinitroethyl-ortho-carbonate.

A typical application of the polymer is as a binder for applying initiator (match head) compositions to bridge wires and graphite bridges. In this application an explosive composition, such as, lead styphnate, lead dioxide and zirconium is mixed with a suitable quantity of poly-2-methyl-5-vinyltetrazole in a solvent, preferably an aliphatic nitrile, such as acetonitrile. The poly-2-methyl-5-vinyl tetrazole is soluble in such a solvent whereas the explosive composition is not. The polymer is used in a quantity such that it will effectively bind the explosive composition to the initiating device. The quantity of solvent used is such that the resulting slurry of solids and liquid will coat the initiating device in a proper manner. The polymer offers several advantages in this application over conventional binders such as nitrostarch and gum arabic. The polymer is chemically inert, insoluble in and not decomposed by water. In contrast to nitrostarch and gum arabic, binder concentrations as high as 10 percent of the weight of match head composition do not appreciably lengthen the ignition delay. The higher binder content improves the ease of buttering the bridge wires, the heat and humidity cycling characteristics, decreases the impact sensitivity of the mixture, and makes for easier quality control.

A further application of the representative polymer is in fuel compositions for gas generators used to power servomechanisms in missiles and in other applications. For this application the polymer is used with ammonium nitrate as an oxidizer, the oxidizer being coated with the polymer. In malking the composition the oxidizer is suspended in a solution of polymer in chloroform, the solvent is evaporated and the residue of polymer-coated oxidizer is dried, ground and pressed into pellets for use. Formulations of 13.2 percent of poly-2-methyl-5-vinyl-tetrazole and 86.8 percent ammonium nitrate, which have a pressed density of 1.67 g./cc. and which are stoichiometrtic to an equimolar mixture of CO and $CO_2$, $H_2O$, and $N_2$, burn cleanly without added catalyst at a rate suitable for gas generator use (0.094 in./sec. at 1,000 p.s.i.). The pressure exponent of burning is approximately one. The linear coefficient of expansion is roughly $75 \times 10^{-6}$. The unconfined pellets burn smoothly without the separation of burning particles and without coning or flash-down even when uninhibited. If inhibited with a thin dip coat of ethylcellulose, the pellets will burn normally even when loosely confined in a tube. This formulation ignites readily with standard ignitors at pressures of 600 p.s.i. and higher. Pressed charges can be easily capped during pressing with a layer of ammonium perchlorate-polymer composition to ensure faster ignition. A formulation containing 50.8 percent polymer and 49.2 percent ammonium nitrate, stoichiometric to CO, $H_2$ and $N_2$ has a calculated heat of explosion of 219 cal./g. The pelleted formulation has burning rates of 0.06 in./sec., 0.09 in./sec. and 0.25 in./sec. at 500, 1,000 and 1,600 p.s.i. respectively.

Obviously, many modifications and variations of the present invention are possible in the light of the above teachings. For example, it is highly probable that the preparation of 1- and 2-vinyl derivatives of tetrazole and 5-substituted tetrazoles may be accomplished by vinylation with acetylene or vinyl acetate using the procedure developed by Reppe. It is therefore to be understood that within the scope of the appended claims the invention may be practiced otherwise than as specifically described.

What is claimed is:
1. 1-methyl-5-vinyltetrazole.
2. 2-methyl-5-vinyltetrazole.
3. 1-vinyltetrazole.
4. A chemical compound of the group consisting of compounds of the formula

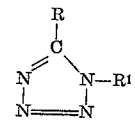

wherein R is a member from the group consisting of hydrogen, amino and lower alkene radicals and $R^1$ is a member from the group consisting of lower alkyl and lower alkene radicals and wherein one of the R and $R^1$ substituents must be a lower alkene radical; and compounds of the formula

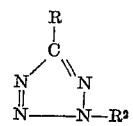

wherein R is a member from the group consisting of hydrogen, amino and lower alkene radicals and $R^2$ is a member from the group consisting of lower alkyl and lower alkene radicals and wherein one of the R and $R^2$ substituents must be a lower alkene radical.
5. 2-vinyltetrazole.
6. 1-vinyl-5-aminotetrazole.
7. 2-vinyl-5-aminotetrazole.
8. 1-allyltetrazole.
9. 2-allyltetrazole.

References Cited in the file of this patent
UNITED STATES PATENTS
2,480,852    Hale et al. _____ Sept. 6, 1949